United States Patent [19]

Takahashi

[11] Patent Number: 5,373,982
[45] Date of Patent: Dec. 20, 1994

[54] AUTOMATICALLY TILTABLE SMALL ROLLER STRUCTURE OF SLIDE BEARING TYPE FOR VIDEO TAPE RECORDERS

[76] Inventor: Shigeo Takahashi, 1-21-16 Soshigaya, Setagaya, Tokyo, Japan

[21] Appl. No.: 68,235

[22] Filed: May 27, 1993

[30] Foreign Application Priority Data

Sep. 24, 1992 [JP] Japan ................................ 4-072089

[51] Int. Cl.⁵ ........................ B65H 20/00; F16C 13/00
[52] U.S. Cl. ................................... 226/194; 384/418; 226/190
[58] Field of Search ................. 226/190, 194; 384/416, 384/417, 418

[56] References Cited

U.S. PATENT DOCUMENTS

| | | | |
|---|---|---|---|
| 1,512,446 | 10/1924 | Barnes | 384/417 X |
| 3,154,260 | 10/1964 | Stanislao et al. | 226/190 X |
| 3,420,590 | 1/1969 | Bilocq | 384/418 X |
| 4,403,720 | 9/1983 | Grant | 226/194 X |
| 4,770,550 | 9/1988 | Takahashi | 226/194 X |

FOREIGN PATENT DOCUMENTS 2308541 11/1976 France ................. 384/416

Primary Examiner—Clifford D. Crowder
Assistant Examiner—John J. Calvert
Attorney, Agent, or Firm—McGlew and Tuttle

[57] ABSTRACT

An automatially tiltable small roller structure of slide bearing type for video tape recorders which has a small roller (10) including an elastic rubber cylinder (11) and a sleeve (12) integral with the inner periphery of the cylinder, the sleeve having a lower inside diameter surface (13) and an upper inside diameter surface (14) with a smaller diameter the former to form a stepped portion (15) inside the sleeve (12), an outer race (21) fitted to the stepped portion, a row of bearing balls (23) fitted in the outer race and located at a middle point between the opposite ends of the sleeve, a shaft (30) having a lower shaft portion (31), an upper shaft portion (32) having a smaller diameter than the lower shaft portion and a tapered surface portion (33) extending between the two shaft portions, the bearing balls being provided such that they are brought into rolling contact with the tapered surface, a region of the upper shaft portion adjacent thereto and the inner peripheral surface of the outer race and first and second plastic sleeves (34), (35) pressed onto the opposite end portion of the shaft, respectively and having a small coefficient of friction and a small coefficient of wear. The second sleeve (35) has at an outer end thereof a flange (36) having a larger diameter than the upper inside diameter surface (14). The roller structure also has a lower annular clearance between the first plastic sleeve (34) and the lower inside diameter surface (13) and an upper annular clearance between the second plastic sleeve (35) and the upper inside diameter surface (14).

7 Claims, 2 Drawing Sheets

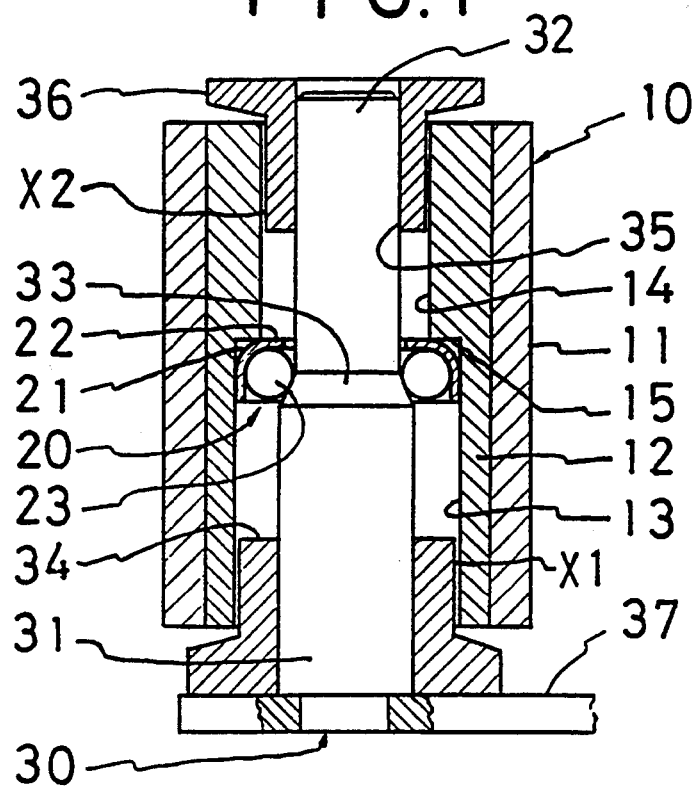
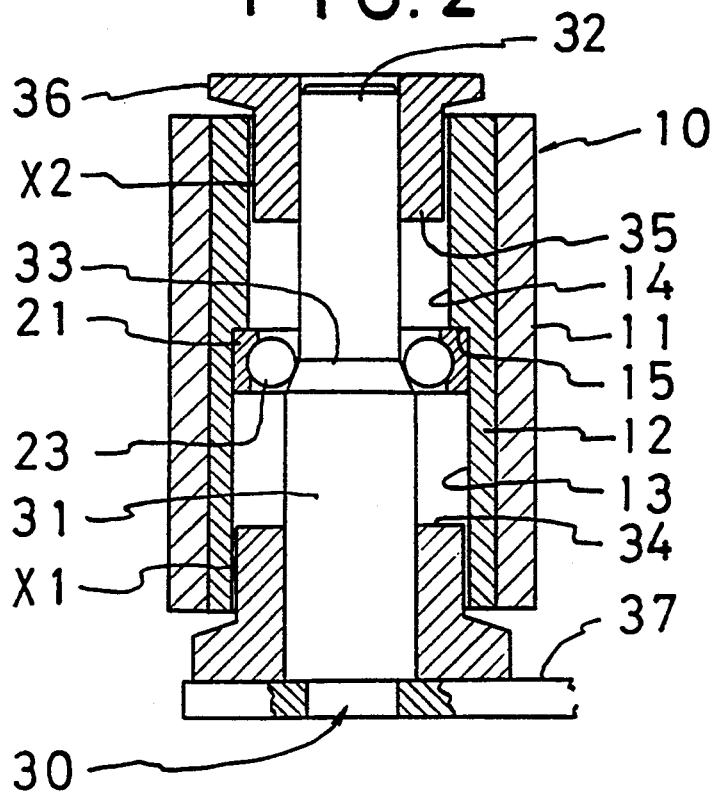

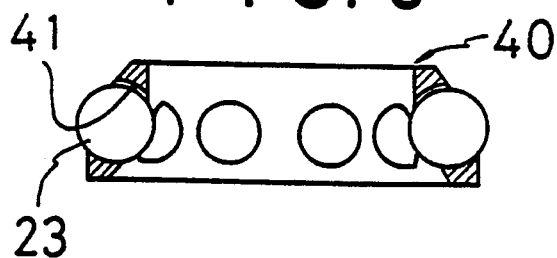
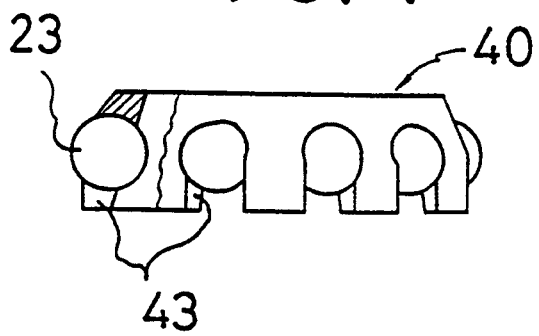
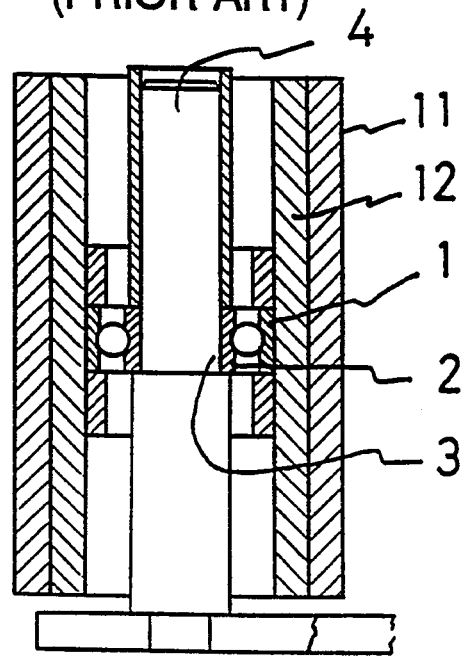
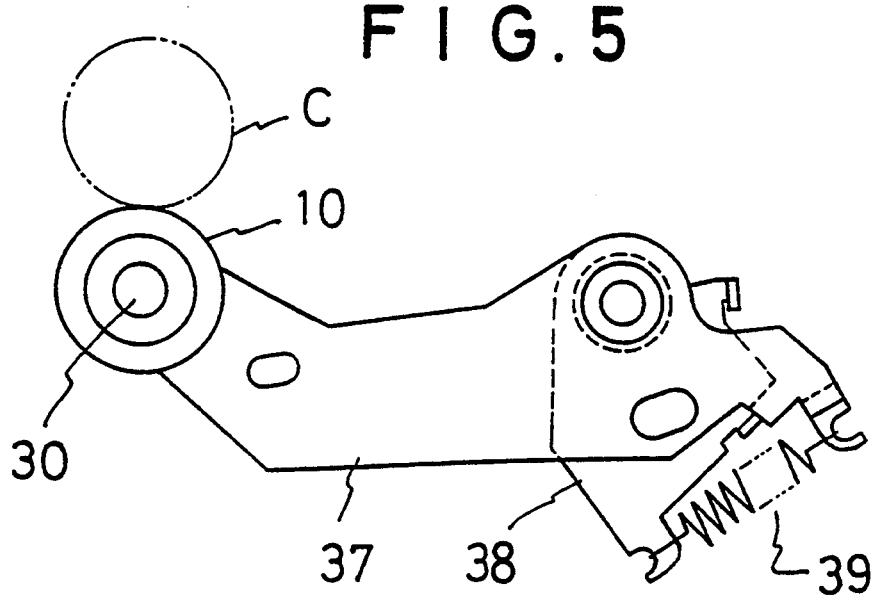

AUTOMATICALLY TILTABLE SMALL ROLLER STRUCTURE OF SLIDE BEARING TYPE FOR VIDEO TAPE RECORDERS

FIELD OF THE INVENTION

The present invention relates mainly to small pinch rollers for guiding magnetic tapes of video tape recorders (VTR) in cooperation with motor-driven rollers or capstans which are mounted within frames of the recorders.

BACKGROUND OF THE INVENTION

As shown in FIG. 6, a prior art small roller of the type described above comprises an elastic rubber cylinder 11, a metal cylinder 12 integral with the inner periphery of the rubber cylinder and a radial ball bearing 3 secured to the inner periphery of the metal cylinder, the ball bearing including an outer race 1 and an inner race 2 which is fixed to a shaft 4.

In this kind of small roller, smoothness in operation, reduction in vibration during operation and durability are particularly required. However, it is pointed out that in general, this kind of prior art small rollers do not always meet such requirements. In general, small rollers used in video tape recorders of VHS type have the outside diameter to the order of 12 to 13 mm and small rollers employed in video tape recorders of the 8 mm type have about 7.7 mm outside diameter.

To use a radial ball bearing 3 requiring an outer race 1 and an inner race 2 in such a small roller structure, a shaft 4 having a small diameter must be used for the structure. Further, these outer and inner races 1, 2, metal sleeve 12 and shaft 4 are a sliding fit instead of a press fit for the technical reason that when they are fitted together in accordance with a press fit method, the outer and inner races 1, 2 are caused to be deformed, resulting in changes in the inside diameter of the outer race 1 and the outside diameter of the inner race 2.

The sliding fit of those members can avoid such changes in the diameters that impart a vibration or rocking motion to the roller. However, it tends to cause a slippage between the sleeve 12 and the outer race 1 and a slippage between the inner race 2 and the shaft 4. Such a slippage is detrimental to ensuring smoothness of rotation of the roller and causes abrasive wear to the parts caused to be slipped. In addition, an error in the sliding fit of the parts that occurs from time to time during assembling work provides a cause for imparting to the roller a vibration or rocking motion which lowers durability of the roller.

Further, in video tape recorders, as it is inevitable that the motor-driven capstans against which a magnetic tape is pressed by pinch rollers are inclined to the order of 0.3° with respect to their longitudinal axes for various technical reasons, it is necessary for the pinch rollers to have an automatic pressure regulating capability in order that they can be brought into pressure contact with the capstans over their entire length.

The radial ball bearing 3 employed in the prior art pinch roller is capable of being tilted for about 5° at maximum with respect to the axis thereof and tends to cause the pinch roller to be excessively tilted. Such a tendency makes the pinch roller unstable in operation, whereby the tape to be transferred is, from time to time, caused to be biased during rotation of the roller. Furthermore, such a prior art pinch roller as mentioned above is constructed such that all the radial load is received only by the radial ball bearing and therefore lacks durable structure.

SUMMARY OF THE INVENTION

The present invention seeks to eliminate the disadvantages or drawbacks indicated with the prior art as described above.

To these ends, in accordance with the present invention, there is provided an automatically tiltable small pinch roller structure of slide bearing type for video tape recorders, comprising: a small roller including an elastic rubber cylinder and a sleeve integral with the inner periphery of the cylinder, the sleeve being formed such that it has a lower inside diameter surface and an upper inside diameter surface having the inside diameter smaller than the lower inside diameter surface to form a stepped portion at the inside of the sleeve; an outer race for a ball bearing fitted to the stepped portion of the sleeve; a row of bearing balls fitted in the inner surface of the outer race and located at a middle point between the opposite ends of said roller; a shaft having a lower shaft portion, an upper shaft portion having a smaller diameter than the lower shaft portion and a tapered surface portion extending between the lower and upper shaft portions, the tapered surface portion becoming smaller toward the upper shaft portion, the shaft being inserted into the roller from the underside thereof, the bearing balls being provided such that they are brought into rolling contact with the tapered surface, a region of the upper shaft portion adjacent thereto and the inner peripheral surface of the outer race; a first plastic sleeve of a relatively large diameter pressed onto the lower shaft portion from above, the underside of the roller, the first plastic sleeve having a small coeffecient of friction as well as a small coefficient of wear; a second plastic sleeve of a relatively small diameter pressed onto the upper shaft portion from above, the second plastic sleeve having a small coefficient of friction as well as a small coefficient of wear and having at an outer end thereof a flange having a larger diameter than the upper inside diameter surface of the sleeve of the roller; a lower annular clearance formed between the first plastic sleeve and the lower inside diameter surface of the sleeve of the roller that allows them to be in sliding contact with each other when the axes of the roller and shaft are tilted relative to each other; and an upper annular clearance formed between the second plastic sleeve and the upper inside diameter surface of the sleeve of the roller that allows them to be in sliding contact with each other when the axes of the roller and shaft are tilted relative to each other.

It is, therefore, one object of the present invention to provide an improved automatically tiltable small roller structure of slide bearing type for video tape recorders which is capable of maintaining stability during rotational movement thereof and which is simple in construction and fabrication thereof.

It is another object of the invention to provide a small roller structure of the type described above which is of high precision and which is capable of ensuring smoothness in operation so as to prevent the video tape recorders from flutters and other detrimental phenomena.

It is a further object of the invention to provide a small roller structure of the type described above which can minimize a vibration or rocking motion during rotational movement thereof and which has high durability.

It is a further object of the present invention to provide a small roller structure of the type described above which is simple in construction and which can be manufactured and sold at a reasonable cost.

It is a still further object of the present invention to provide a small roller structure of the type described above which is suitable for use in video tape recorders of the 8 mm type.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF DRAWINGS

FIG. 1 is a vertical cross-sectional front view, in an enlarged scale, of one embodiment of the present invention;

FIG. 2 is a vertical cross-sectional front view, in an enlarged scale, of another embodiment of the present invention;

FIG. 3 is a vertical cross-sectional front view, in an enlarged scale, of one embodiment of the bearing used in the present invention;

FIG. 4 is a partly cross-sectional front view, in an enlarged scale, of another embodiment of the bearing used in the present invention;

FIG. 5 is a front view of an operating lever mechanism having a pinch roller; and FIG. 6 is a vertical cross-sectional front view, in an enlarged scale, of a prior art pinch roller;

DETAILED DESCRIPTION OF THE PREFERRED EMBODIMENTS

Referring now to the drawing in FIG. 1, there is shown one embodiment of the present invention. Designated by reference numeral 10 is a small pinch roller which includes an outer layer formed by an elastic rubber cylinder 11 and an inner layer formed by a sleeve 12 which is made of a metal, such as brass. The sleeve 12 is formed such that it has a lower or first inside diameter surface 13 and an upper or second inside diameter surface 14 having the inside diameter smaller than the lower inside diameter surface 13 to form a stepped portion 15 inside the sleeve 12 at a middle portion thereof demarcating the lower inside diameter surface 13 and the upper inside diameter surface 14. Each of the inside diameter surfaces 13, 14 has a uniform diameter over its entire length.

The small roller 10 to be used in a video tape recorder of VHS type has the outside diameter to the order of 12 to 13 mm and is about 17 to 18 mm long in length. On the other hand, the small roller 10 to be used in a video tape recorder of 8 mm type has about 7.7 mm outside diameter and is about 10 mm long in length.

A ball bearing 20 includes an outer race 21 and a plurality of bearing balls 23. The outer race 21 is inserted inside the lower inside diameter surface 13 of the sleeve 12 from the underside thereof and is fitted to the stepped portion 15 of the sleeve 12. The outer race 21 is made from hard carbon chrome steel (SUJ 2) by press working. As shown in FIG. 1, it is provided with a rib portion 22 which projects inwardly from the stepped portion 15 and has L cross-section shape, approximately. The balls 23 are in rolling contact with the rib 22 as well as the inner peripheral surface of the outer race 21. A layer of electro-conductive engineering plastics material, such as polytetrafluoroethylene may be formed on the inner peripheral surface of the outer race 21.

Indicated by reference numeral 30 is a shaft which has a lower shaft portion 31, an upper shaft portion 32 having a smaller diameter than the lower shaft portion 31 and a tapered surface portion 33 extending between the lower and upper shaft portions 31, 32. The bearing balls 23 are arranged to be in rolling contact with the tapered surface 33 which becomes smaller toward the upper shaft portion 32 and with a region of the upper shaft portion 32 adjacent to the tapered surface 33. In the illustrated embodiment, the small roller structure is designed such that when the bearing balls 23 in contact with the tapered surface 33 are displaced toward upper shaft portion 32 for only about 0.1 to 0.5 mm, they are brought into contact with the region of the upper shaft portion.

Denoted by reference numeral 34 is a first plastic sleeve or first roller guide means of a relatively large diameter which is pressed onto the lower shaft portion 31 from the underside thereof. Also, a second plastic sleeve 35 or first roller guide means of a relatively small diameter is pressed onto the upper shaft portion 32 from above. This sleeve 35 has at its outer end a flange 36 integrally formed therewith and having a lager diameter than the upper inside diameter surface 14 of the sleeve 12 of the roller 10 so that the roller 10 will not come out or slip off and so that the amount of axial displacement of the roller 10 will be restricted.

The roller 10 is provided with a lower annular clearance X1 and an upper annular clearance X2. The lower clearance X1 is formed between the larger plastic sleeve 34 and the lower inside diameter surface 13 of the sleeve 12 of the roller. The upper clearance X2 is formed between the smaller sleeve 35 and the upper inside diameter surface 14 of the sleeve 12 of the roller. In the illustrated embodiment, the roller is designed such that by the provision of such clearances X1 and X2, the axes of the roller and shaft are made slightly tiltable relative to each other by an angle of 1°. However, it may be designed such that the axes are made tiltable relative to each other by an angle of 1° to 1.5° as desired. It is preferable that when the actual length of the roller is 18 mm, the dimension of each of the clearances X1 and X2 is 135 microns and that when the actual length of the roller is 10 mm, the dimension is about 75 microns.

In the illustrated embodiment, the ball bearing 20 is to be lubricated with grease before assembly of the pinch roller is completed. The row of the bearing balls 23 is positioned at a middle point between the opposite ends of the roller 10 when the shaft 30 is fitted therein.

As shown in FIGS. 1 and 5, the shaft 30 of the roller is securely mounted on the tip end of the lever 37 at a portion projecting from the larger shaft portion and the other end of the lever 37 is pivoted to a supporting member 38 which is fixed to a frame of a video taperecorder. The lever 37 is resiliently biased by means of a spring 39 so that the roller 10 is pressed against the capstan C as a drive roller.

The roller 10 is axially slightly movable with respect to the shaft 30 and the bearing balls 23 which are arranged so as to be in rolling contact with the tapered surface 33 and the region or portion of the smaller diameter shaft portion 32 adjacent to the tapered surface 33 are axially movable within the range of 0.5 mm to 1 mm.

As the material for the plastic sleeves 34, 35, there was used "Excelide-D" (Registered Trademark: EXCELIDE) of Nichias Co., Ltd. at the time of the present invention.

Physical properties of the material "Excelide-D" are shown in the following Table.

TABLE

| Items | Measurements |
|---|---|
| Density | 2.70 g/cm$^3$ |
| Tensile Strength | 250. kgf/cm$^3$ |
| Tensile Elongation | 15.% |
| Hardness | 68 (D) |
| Compressive Strength | 80~170 kgf/cm$^2$ |
| Compressive Elastic Modulus | 9.8 × 10$^3$ kgf/cm$^2$ |
| Thermal Expansion Coefficient | −100~25° C. 8.5 × 10$^{-5}$/°C. |
| | 25–100° C. 1.2 × 10$^{-4}$/°C. |
| | 100–200° C. 1.2 × 10$^{-4}$/°C. |
| | 200–250° C. 1.4 × 10$^{-4}$/°C. |
| Volume Resistivity | 5.0Ω · cm |

In the embodiment illustrated in FIG. 1, when the pinch roller 10 is brought into pressure contact with the capstan C, the axes of the roller and shaft 30 are adapted to be inclined relative to each other in accordance with an angle of inclination of the capstan C. In this case, even if the inside diameter surfaces 13, 14 of the sleeve 12 are brought into contact with the plastic sleeves 34, 35, respectively during rotational movement of the roller, frictions to be produced between the surfaces 13, 14 and the sleeves 34, 35 can be minimized, because these sleeves 34, 35 are made of the engineering plastics as referred to above. Also, for the same reason, generation of static electricity can be effectively prevented.

Further, with the construction of the illustrated embodiment, the pressure contact between the pinch roller 10 and the capstan C can be made stable, even though the roller continues rotating in a tilted state, since the angular range within which the axes of the roller and shaft 30 can be tilted relative to each other is limited to an angle of 1° to 1.5° at maximum. In addition, as the amount of axial displacement of the bearing balls 23 is also limited to the order of 0.5 mm to 1.0 mm, the bearing balls 23 which are in pressure contact with the tapered surface 33 are only allowed to be displaced toward the smaller diameter shaft portion 32 within the limited range. Accordingly, the balls 23 are confined there while being in rolling contact with the surface of the shaft portion 32 and receive the radial load imparted to the bearing 20. Furthermore, by the provision of the plastic sleeve 35 snugly fitted onto the smaller diameter shaft portion 32 and having the flange 36, the pinch roller 10 is prevented by the flange 36, which functions as a stopper for the roller, from being displaced beyond the inner surface of the flange 36, even when the roller is pushed toward the flange by the force that might be exerted thereon in such a case that the VTR is removed or transported.

Referring now to the drawing in FIG. 2, there is illustrated another embodiment of the present invention. This embodiment differs from the first embodiment only in that an outer race 21 is formed of sintered carbide containing or mixed with lubricant and that an annular retainer 40 is employed so that bearing balls 23 will not come into contact with each other. Other portions or parts are the same as those of the first embodiment and are designated with the same reference numerals and characters as those used in FIG. 1. Therefore, to avoid repetition, the description will be omitted as to those portions.

The outer race 21 may be made of the engineering plastics material previously mentioned in detail. Preferably, the retainer 40 is made of the engineering plastics "Excelide-9550S" of Nichias Co., Ltd. or the like.

The retainer 40 shown in FIG. 3 is shaped into a tapered cylinder and has in its cylindrical portion a plurality of openings such as circular opening 41 which are equidistantly arranged so as to retain bearing balls 23 therein, individually. As shown in FIG. 3, each opening 41 is provided with a clearance which is formed between the spherical surface of a ball 23 and the inner peripheral surface of the opening. The dimention of the clearance is to the order of 3% to 5% of the diameter of the bearing ball 23.

The retainer 40 shown in FIG. 4 is of substantially same cofiguration as that of the retainer shown in FIG. 3. This retainer 40 is provided with a plurality of openings shaped as cut-outs 43 for movably receiving bearing balls 23, respectively.

The construction of the second embodiment described above allows the bearing balls 23 to make rolling movement independently of each other between the outer race 21 and the tapered surface 33 or the smaller diameter shaft portion 32, thereby reducing resistance to their rolling movement.

Furthermore, by the provision of the aforementioned clearances in the retainer 40 and with physical properties thereof, the pinch roller 10 is permitted to be smoothly rotated, even when the axes of the roller and shaft 30 are caused to be tilted relative to each other and the track of rolling of each bearing ball is made slightly elliptic.

It will be understood that with the roller structure according to the present invention, the roller and the shaft can tilt or rock slightly relative to each other for a range of clearance dimension between the roller and the plastic sleeves respectively mounted on the shaft at opposite end portions thereof about the row of bearing balls, and the roller can rotate about the shaft while they are undergoing instantaneous changes in their relative orientation.

It will also be understood that as the roller and the shaft tilt or rock slightly relative to each other, the upper inside diameter surface of the sleeve or the lower inside diameter surface of the sleeve is brought into sliding contact with the upper plastic sleeve or the lower plastic sleeve. It is also understood that the lower shaft portion of the shaft has a larger diameter than the upper shaft portion thereof and the physical strength of the shaft necessary for rotatably supporting the roller is much higher than that of the shaft employed in the prior art roller structure. A vibration or rocking motion of the roller, which is detrimental to operation of the VTR, due to lateral deflection of the shaft can be minimized by these features. In this connection, it is to be noted that in general, the shafts used in 8 mm type video tape recorders marketed at present are of 1.5 mm diameter and tend to make a vibration of pinch roller, but, according to the present invention, it is possible to make a shaft of a larger diameter which can minimize such a vibration.

What is claimed is:

1. A tiltable roller bearing structure for video tape recorders, the structure comprising:
a roller having a first end and a second end, said roller including an outer layer formed by an elastic cylinder and also including an inner layer formed by a sleeve attached to an inner periphery of said elastic cylinder, said sleeve having a first inside diameter surface adjacent said first end of said roller and having a second inside diameter surface adjacent said second end of said roller, said second inside surface being smaller in magnitude than said first inside surface, said sleeve also having a stepped portion between said first and second inside diameter surfaces;

an outer bearing race attached to said stepped portion of said sleeve;

a shaft positioned inside said sleeve, said shaft having a first portion positioned adjacent said first end of said roller and having a second portion positioned adjacent said second end of said roller, said second portion of said shaft having a smaller diameter than said first portion of said shaft, said diameter of said first portion being spaced from said first inside diameter surface of said sleeve and said diameter of said second portion being spaced from said second inside diameter surface of said sleeve, said shaft having a tapered surface extending between said first portion and said second portion;

a plurality of bearing balls positioned at a substantial middle point between said first and second ends of said roller and between said outer bearing race and said shaft, said plurality of bearing balls being in rolling contact with said tapered surface, a region of said second portion of said shaft adjacent said tapered portion and said outer bearing race;

a first plastic sleeve pressed onto said first portion of said shaft and positioned between said shaft and said roller, said first plastic sleeve being spaced from said first inner surface of said roller by a magnitude limiting an amount of tilt of said roller, said first plastic sleeve having means for providing a small coefficient of friction and a small coefficient of wear when said roller is tilted and said sleeve of said roller comes into sliding contact with said first plastic sleeve;

a second plastic sleeve pressed onto said second portion of said shaft and positioned between said shaft and said roller, said second plastic sleeve being spaced from said second inner surface of said roller by a magnitude limiting an amount of tilt of said roller, said second plastic sleeve having means for providing a small coefficient of friction and a small coefficient of wear when said roller is tilted and said sleeve of said roller comes into sliding contact with said second plastic sleeve, said second plastic sleeve including a flange positioned at an end of said second portion of said shaft and having a diameter larger than said second inside diameter surface of said roller.

2. A structure in accordance with claim 1, wherein: said roller is tiltable with respect to said shaft by a maxim of 1.5 degrees.

3. A structure in accordance with claim 1, wherein: said first and second plastic sleeves are made of tetrafluoroethylene.

4. A structure in accordance with claim 1, further comprising:

a bearing ball retainer means for holding said plurality of bearing balls spaced from each other, said bearing ball retainer means including supporting portions defining an opening supporting one of said plurality of bearing balls, said openings being slightly larger than said bearing balls.

5. A structure in accordance with claim 4, wherein: said openings are substantially circular in shape.

6. A structure in accordance with claim 4, wherein: said openings are formed as cut-outs.

7. A device for guiding magnetic tape in video tape recorders, the device comprising:

a roller having a first end and a second end, said roller having a first inside diameter surface adjacent said first end of said roller and having a second inside diameter surface adjacent said second end of said roller, said second inside surface being smaller in magnitude than said first inside surface, said roller also having a stepped portion between said first and second inside diameter surfaces;

an outer bearing race attached to said stepped portion of said roller;

a shaft positioned inside said roller, said shaft having a first portion positioned adjacent said first end of said roller and having a second portion positioned adjacent said second end of said roller, said second portion of said shaft having a smaller diameter than said first portion of said shaft, said diameter of said first portion being spaced from said first inside diameter surface of said roller and said diameter of said second portion being spaced from said second inside diameter surface of said roller, said shaft having a tapered surface extending between said first portion and said second portion;

a plurality of bearing balls positioned between said outer bearing race and said shaft, said plurality of bearing balls being in rolling contact with said tapered surface, in rolling contact with a region of said second portion of said shaft adjacent said tapered portion and also in rolling contact with said outer bearing race, said plurality of bearing balls causing said roller to be tiltable with respect to said shaft;

a first roller guide pressed onto said first portion of said shaft and positioned between said shaft and said roller, said first roller guide being spaced from said first inner surface of said roller by a magnitude limiting an amount of tilt of said roller, said first roller guide having means for providing a small coefficient of friction and a small coefficient of wear when said roller is tilted and said roller comes into sliding contact with said first roller guide;

a second roller guide pressed onto said second portion of said shaft and positioned between said shaft and said roller, said second roller guide being spaced from said second inner surface of said roller by a magnitude limiting an amount of tilt of said roller, said second roller guide having means for providing a small coefficient of friction and a small coefficient of wear when said roller is tilted and said roller comes into sliding contact with said second roller guide, said second roller guide including a flange positioned at an end of said second portion of said shaft and having a diameter larger than said second inside diameter surface of said roller;

a lever attached to said second end of said shaft;

pivot means for pivoting said shaft and said roller from a first position to a second position;

a capstan positioned to be biased against said roller when said roller is in said second position and guide magnetic tape positioned between said roller and said capstan.

* * * * *